US009485212B1

(12) United States Patent
Bastide et al.

(10) Patent No.: US 9,485,212 B1
(45) Date of Patent: Nov. 1, 2016

(54) MESSAGE MANAGEMENT METHOD

(71) Applicant: INTERNATIONAL BUSINESS MACHINES CORPORATION, Armonk, NY (US)

(72) Inventors: Paul R. Bastide, Boxford, MA (US); Matthew E. Broomhall, Goffstown, NH (US); Robert E. Loredo, North Miami Beach, FL (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 14/995,336

(22) Filed: Jan. 14, 2016

(51) Int. Cl.
G06F 15/16 (2006.01)
H04L 12/58 (2006.01)

(52) U.S. Cl.
CPC .............. *H04L 51/32* (2013.01); *H04L 51/16* (2013.01)

(58) Field of Classification Search
None
See application file for complete search history.

(56) References Cited

U.S. PATENT DOCUMENTS

| 8,417,649 | B2 | 4/2013 | Hamilton, II et al. | |
|---|---|---|---|---|
| 9,002,892 | B2 | 4/2015 | Benyamin et al. | |
| 2004/0236721 | A1* | 11/2004 | Pollack | G06F 17/30699 |
| 2005/0060643 | A1* | 3/2005 | Glass | G06F 17/241 715/205 |
| 2006/0235933 | A1* | 10/2006 | Baluja | H04L 51/26 709/207 |
| 2014/0006400 | A1 | 1/2014 | Bastide et al. | |
| 2014/0297737 | A1 | 10/2014 | Beckley et al. | |
| 2015/0372963 | A1* | 12/2015 | Root | H04L 51/32 709/206 |
| 2016/0112359 | A1* | 4/2016 | Allen | H04L 51/14 709/206 |
| 2016/0147731 | A1* | 5/2016 | Parikh | G06F 17/276 715/261 |
| 2016/0182420 | A1* | 6/2016 | Shen | H04L 51/12 709/206 |

OTHER PUBLICATIONS

Rohall et al., "ReMail: A Reinvented Email Prototype," CHI 2004, Vienna, Austria, Apr. 24-29, 2004.
MacLean et al., "Groups Without Tears: Mining Social Topologies From Email," IUI 2011, Feb. 13-16, 2001.
Reed, "Facebook Looks to Improve News Feed Content Quality," Marketing Pilgrim, posted Aug. 26, 2013.
"Facebook Launches Advanced AI Effort to Find Meaning In Your Posts," Facebook, posted on Sep. 21, 2013.
Wikipedia, "Graph Theory" https://en.wikipedia.org/w/index.php?title=Graph_theory&oldid=693900353.

(Continued)

*Primary Examiner* — Natisha Cox
(74) *Attorney, Agent, or Firm* — Weitzman Law Offices, LLC

(57) ABSTRACT

A method for managing computer based messaging involves monitoring messages transmitted within a messaging system over time; identifying related messages; and automatically analyzing the related messages using natural language analytics. The analyzing is based upon: subject of, sentiment within, and context of, each of the related messages, and frequency of transmittals of the related messages. The analyzing involves assigning at least: a first value based upon sentiment, a second value based upon content, and a third value based upon frequency, and calculating a score for the related messages as a function of the first value, second value and third value, comparing the score to a pre-specified threshold value; and when the score exceeds the pre-specified threshold value, automatically generating and issuing at least one of: (i) a summary of the related messages, (ii) a timing based notification message, or (iii) a content-based notification regarding a score inflection point.

1 Claim, 3 Drawing Sheets

(56) References Cited

OTHER PUBLICATIONS

Wikipedia, "Natural Language Processing" https://en.wikipedia.org/w/index.php?title=Natural_language_processing&oldid=693841435.
Wikipedia, "Deep Learning".
IBM, "SPSS Text Analytics for Survey" http://www-03.ibm.com/software/products/en/spss-test-analytics-surveys. IBM, "Download SwiftFile Mail Assistant for Notes Client 8.x" http://www-01.ibm.com/support/docview.wss?uid=swg24019219.
IBM, "SPSS Statistics" http://www-01.ibm.com/software/analytics/spss/products/statistics/.
IBM, "IBM ifundIT".
Gmail Help, Muting or ignoring conversations https://support.google.com/mail/answer/47787?hl=en.
SaneBox https://www.sanebox.com/business.

\* cited by examiner

200 {

202 — December 09, 2015 14:22:07
From: Doug@company.com
To: Bob@company.com; Chuck@company.com; Alice@company.com
Subject: Product Alpha Debug
Alpha server is down again - this is the third time in two days! Production is furious because release is now at risk. I know both were thoroughly tested, but it must be due to interaction between the new software patch and OS update because those are the only things that have changed.

204 — December 09, 2015 14:26:34
From: Bob@company.com
To: Doug@company.com; Chuck@company.com; Alice@company.com
Subject: Product Alpha Debug
Will check, but don't think so, patch was checked w/new OS pre-release.

December 09, 2015 14:50:01
From: Bob@company.com
To: Doug@company.com
cc: Chuck@company.com; Alice@company.com
Subject: Product Alpha Debug
Tried here, no crash. Chuck will take over and continue to try and replicate and seek other potential causes. — 206

208 { December 09, 2015 17:41:07
From: Chuck@company.com
To: Bob@company.com; Doug@company.com
cc: Alice@company.com
Subject: Product Alpha Debug
Tried several loadings and combinations while running continually for about 3hrs - no crashes. Will continue overnight.

210

December 10, 2015 07:26:07
From: Doug@company.com
To: Bob@company.com; Chuck@company.com; Alice@company.com
Subject: Solved! - Product Alpha Debug
Ran hardware diag. numerous times overnight on multiple servers - came in and found that one memory chip on card in server occasionally fails under heavy write loads. HW group replaced mem 1/2 hr ago and so far no fails. Thanks for your efforts!

212 — December 10, 2015 07:27:22
To: Alice@company.com
Subject: NOTICE - Product Alpha Debug
Overnight debug. Hardware diag - Replaced mem. No fails - debug solved.

FIG. 2

MESSAGE MANAGEMENT METHOD

FIELD OF THE INVENTION

This disclosure relates generally to computers and, more particularly, to computer-based messaging systems.

BACKGROUND

Mail clients and online social networks are now recognized as a universal mechanism for connecting people and information in logical and organized ways, thereby enabling easy sharing of information among the users. The most common mechanisms for sharing information within such mechanisms are the inbox, wall, activity stream, timeline or profile. While these mechanisms enable one to rapidly share and receive information, the volume can be daunting and, in many cases, each user must read and responds to countless separate conversations each day. Unfortunately, this creates a significant technical problem for those who may be on copy for the messages, but not directly involved because such conversations can distract from work activity or other more important conversations, yet they cannot be ignored entirely because there may be relevant information within them that the other recipient(s) need to know.

SUMMARY

We have devised a solution to the foregoing problem that can minimize distracting messaging while continuing to ensure that important information from the messaging is received.

One aspect of this disclosure involves a method for managing computer based messaging. The method involves monitoring messages transmitted among persons within a messaging system over time, the messaging system including computer devices, each having at least one processor. At least some of the computer devices are individually associated with each of the persons. The messages are stored in non-transitory storage, and the messages collectively comprise a communication history.

The method further involves, identifying related messages within the communication history, and automatically analyzing the related messages, spanning a time interval, within the communication history, using a processor and natural language analytics. The analyzing is based upon: (i) subject of each of the related messages, (ii) sentiment within each message of the related messages, (iii) context of each of the related messages, and (iv) frequency of transmittals of the related messages. The analyzing involves assigning, using the processor, at least: a first value based upon the sentiment, a second value based upon content, and a third value based upon frequency, calculating a messaging trend score for the related messages as a function of the first value, second value and third value, and comparing the messaging trend score to a pre-specified threshold value.

When the score exceeds the pre-specified threshold value, the method also involves automatically generating and issuing, using the processor, at least one of: (i) a summary of the related messages, (ii) a timing based notification message to at least one of the persons, or (iii) a content-based notification to at least one of the persons regarding a messaging trend score inflection point.

The foregoing and following outlines rather generally the features and technical advantages of one or more embodiments of this disclosure in order that the following detailed description may be better understood. Additional features and advantages of this disclosure will be described hereinafter, which may form the subject of the claims of this application.

BRIEF DESCRIPTION OF THE DRAWINGS

This disclosure is further described in the detailed description that follows, with reference to the drawings, in which:

FIG. 2 illustrates, in simplified form, one example of a set of related messages exchanged within the example system.

DETAILED DESCRIPTION

This disclosure provides a technical solution to address the aforementioned problems inherent with messaging systems.

Figure 1:
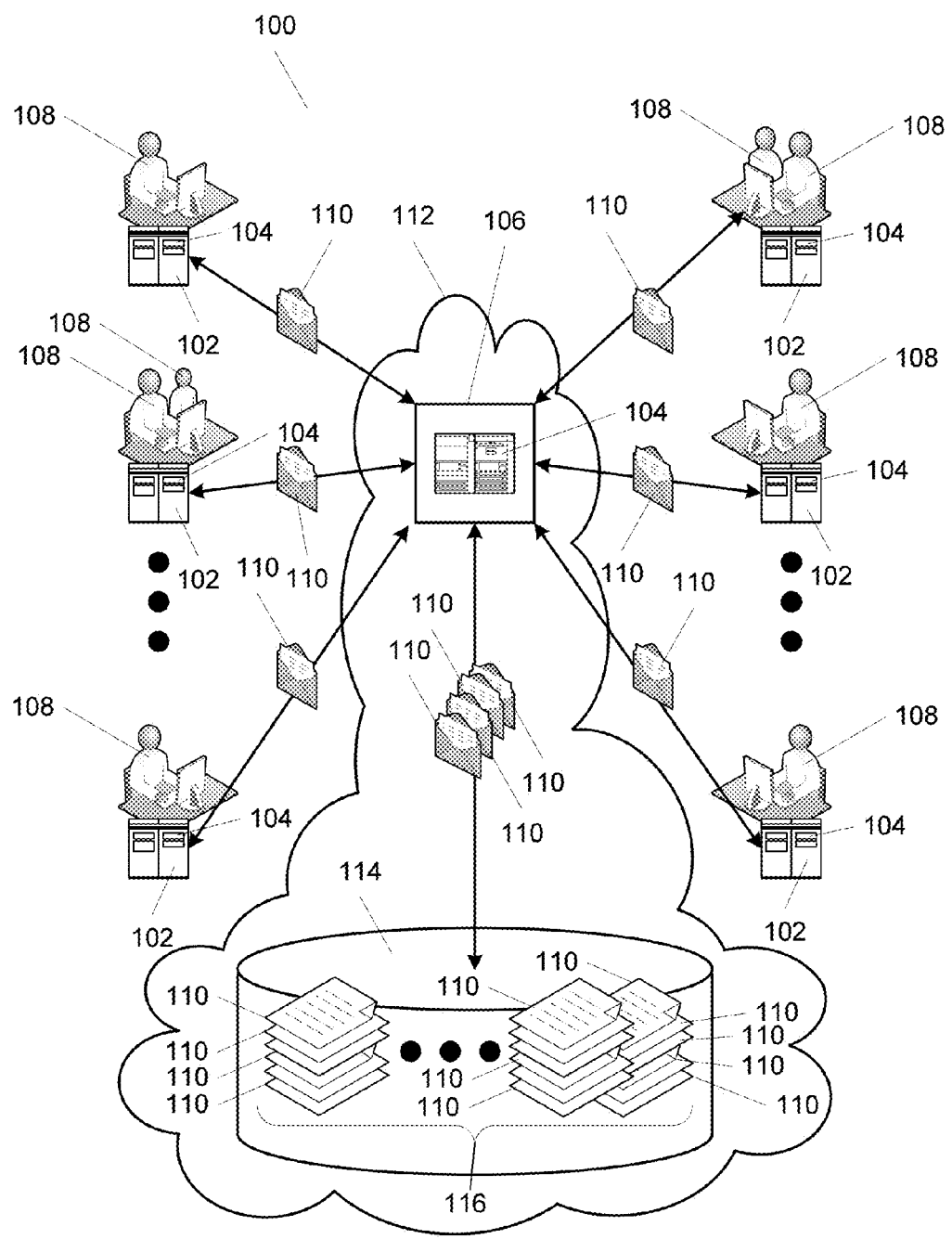
FIG. 1 illustrates, in simplified form, a messaging system incorporating computer based messaging management as described herein.

FIG. 1 illustrates, in simplified form, a messaging system 100 incorporating computer based messaging management as described herein. As shown in FIG. 1, the messaging system 100 is made up of multiple computer devices 102 that each has at least one processor 104. The computer devices 102 are interconnected to each other via at least one communication server 106 that also has at least one processor 104 and programming that allows persons 108 to exchange messages 110 relating to various subjects with each other. Depending upon the particular implementation, the communication server 106 can be connected to via a wired or wireless network 112 and it may be a local mail server running, for example, IBM Notes/Domino, Microsoft Exchange, Open-Xchange, Zimbra, etc., or it can be a remote e-mail system like Google gmail. Likewise, the communication server 106 can include/incorporate social messaging systems as well, for example, "Twitter," "I Follow," "I Connect" and "IBM Connections" to name a few. In the foregoing regard, it should be understood that the communication server 106 may, in implementation, involve multiple servers that may themselves be made up of distributed physical servers.

Associated with, and accessible to, the processor(s) 104 of the communication server 106 is storage 114 that stores the messages 110 as they are exchanged along with, for example, data-containing structures, and program instructions in a non-transitory manner, for example, such as non-transient solid state memory, a magnetic hard drive, a CD or DVD, a tape drive, or an analogous or equivalent storage medium type would. The messages 110 passed within the system 100, as stored in the storage 114, collectively make up a communication history 116 in that they represent all of the communications (e.g., conversations) exchanged among the parties via the system 100 for each subject.

An application (which may itself be a unitary or distributed application) program that effects the operation described herein runs on at least one processor 104, of the communication server 106, so that it has access to all communication flow, monitors/listens to all new messages arriving in the storage 114 for all all inboxes, views, incoming communication folders, or in wall or profile postings, and may also listen to compliance APIs, API calls or firehose messages (individually and collectively considered hereinto be "messages").

In the process, the application extracts the metadata from each message in the communication history 116, as well as the content of each message.

The application identifies related messages within the communication history 116 based on, for example, the subject, parties, timing interval, etc., and separates them into conversations on a subject/topic basis. The process will now be discussed with reference to a hypothetical set of communications.

FIG. 2 illustrates, in simplified form, one example of a set 200 of related messages exchanged within the example system 100.

In accordance with FIG. 2, presume that Alice is the critical situation product executive for Product Alpha, and Bob, Chuck and Doug are engineers working on the release software for Product Alpha. In conjunction with the Product Alpha project, a conversation is initiated among Doug, Bob and Chuck, and, given the nature of the communication, Alice is included.

The application program of the system 100 monitors the conversation as messages are exchanged and stored in the storage 114 associated with the communication server 106.

Doug starts a conversation in a message 202 discussing Product Alpha.—The Product Alpha Server is down again.

Bob responds with a message 204 that he will check, but doesn't believe that his patch effort is responsible. About 25 minutes later, Bob sends a follow-up message 206 updating Doug on the status and indicates that Chuck will be taking over investigation.

Over the next several hours, Chuck, Bob and Doug exchange many messages 208 about debugging the issue with Product Alpha.

Finally, Doug responds with a message 210 that the issue was found and fixed.

In overview, in the background, as messages are exchanged, the application uniquely analyzes the related messages that span a particular relevant time interval for each unique subject/topic to identify a trend based on time, subject, sentiment and natural language characteristics for the content of the messages. Specifically, each unique subject/topic within the time interval is analyzed using known natural language analytics against the content and context of the messages to generate feature vectors for feature identification and entity recognition. These feature vectors are used, in a known manner, to determine the sentiment of the related messages. That sentiment is then assigned a value.

In addition, another value is assigned based upon the actual content of the messages, and a third value is assigned based upon the frequency of the messages within the time interval.

Depending upon the particular implementation, the values are selected as representative of the information to be gleaned. For example, sentiment may only be assigned 3 values, for example: 5 for positive, 0 for neutral, and −5 for negative, or 10 for positive, 0 for negative and 5 for neutral. Alternatively, qualitative assessment may be made of a degree of sentiment, such that intermediate values can also be assigned. Content values are assigned based upon the actual content in the message, either alone or relative to the immediately preceding message(s). For example, a message with significant substantive content may be assigned a high value, for example, on a 0 to 5 scale of "5" whereas a message with low substantive content may be given a low value of "1" and a message with no substantive content, for example, a message acknowledging receipt, could be assigned a value of "0" for its content.

The values are then combined to obtain a messaging trend score for the related messages and stored in the storage 114, for example, in a lookup table. As such, the scores over time represent a historic trend for the conversation against which new scores can be compared, as a threshold value, and actions can be taken as a result of, for example, the an increasing or decreasing trend, an inflection point (change between negative and positive or significant score deviation), a variation outside some tolerance amount, or according to some pre-existing pattern, for example, a sine/cosine pattern.

Depending upon the particular implementation, the values can be weighted to reflect certain realities of the particular environment, for example, that older messages may tend to be less important and so can be dropped unless they "bounce" back up, or that messages from certain people in certain contexts should carry more weight than others, for example, the content values for messages of the chief engineer on a project or the CFO with respect to budgets should be given more weight than say, respectively, an engineering technician or the head of the payroll department. Likewise, the way that values are combined to obtain the messaging trend score can be altered from a simple summation, to a multiplied value (omitting or taking into account the effect or potential inclusion skewing zero values).

Returning now to the hypothetical from above, the analysis will be described with the idea that, as the manager, at some point, Alice may not need to actually wade through every message as, and when, sent.

Doug starts a conversation in a message 202 discussing Product Alpha.—i.e., the Product Alpha Server is down again. As a result, the system 100 starts its analysis because the message subject and content indicates that it is a new conversation. The system 100 then analyzes the message and assigns initial values, in this example, with sentiment and context values ranging from 0 to 10, for example, calculated based upon the content as a function of, for example, conflict or agreement, with prior message(s), pulse (the number of messages within the time), topic(s), length, importance and tense of the message, and frequency value being based upon, for example, the number of related messages per minute so, by way of example, the initial message is assigned values as follows: [Sentiment–Very Negative (Value=1), Context–Product Alpha (Value=5), Frequency–(Value=1)].

The system 100 then determines an initial trend score for the conversation as a sum of the values it assigns from analysis of the message, e.g., the initial trend score for the message is 1+5=1=7 and it stores that value for that conversation.

Bob responds 204 to Doug's message 202 and it is scored as well, with assigned values as follows [Sentiment–Negative (Value=2), Context–Debug (Value=5), Frequency–(Value=1); Trend score: 2+5+1=8] and stores those values. The values for this new message are then compared against the prior message to determine whether some pre-specified threshold has been exceeded for purposes of notifying Alice. Depending upon the particular implementation, that pre-specified threshold can be an absolute value, for example, a trend score in excess of some number, it can be a relative deviation, for example a trend score that deviates from the prior score, or the historical average trend score for the conversation, by more than a certain percentage, or it can be a deviation reflective of an inflection, for example, the trend score components have continually involved one non-neutral sentiment and that sentiment has changed to the opposite sentiment. In addition, the threshold can be set differently for different persons for example (i.e., the key people will get every message, certain managers will get regular summaries, and/or high level or superficially involved people will only get occasional notices when, for, example, something significant is conveyed), and/or different granularity can be conveyed (i.e., how much detail is in a given summary or notice for that person).

Returning to the example, here, the trend score has only changed by 1, so it is merely stored and, in this case, the average trend score is calculated to be 7.50 (i.e, (7+8)/2).

A few moments later, Bob sends his update message 206 [Sentiment–Negative (Value=1), Context–Debug (Value=5), Frequency–(Value=2); Trend score: 1+5+2=8; Average trend score (7+8+8)/3=7.67].

Over the next several hours, Bob sends Doug dozens of messages about debugging the issue with Product Alpha and the system 100 continues to determine the trend for the conversation. [Trend: Sentiment–Negative (Value=1), Context–Debug (Value=2), Frequency–10 (Value=10); Trend score=13; Average trend score=8.13].

As a result of this monitoring, over time, the system has determined the trend is consistent (consistency over time being a threshold) and, since Alice is an executive role, instead of getting new messages as debugging proceeds, the system 100, starts generating a periodic summary message from the messages, using natural language generation techniques or, in simpler versions, by merely compiling the substantive content of the messages, and begins issuing those summary messages on a frequency of one summary notification message every thirty minutes.

Thus, over the course of the three hour debugging session, Alice receives only six summary messages instead of the dozens actually sent.

The next morning, Doug responds that he has identified and fixed the issue and the system 100 determines the trend [Trend: Sentiment–Positive (Value=10), Context–Debug solved (Value=9), Frequency–(Value=1); Trend score=20; Average trend score=12.4]. Here, the system 100 recognizes both an inflection point in sentiment value and a trend score that is well above both the previous trend score and the average trend score values. As such, the system 100 has three choices, it can send another summary to Alice, as it has done over the course of the conversation, it can send a notification based upon the timing e.g., no message has been sent for in excess of several hours, or it can send a content-based notification message due to the messaging trend score sentiment and/or total score inflection point.

Here, the inflection point-based notification is selected because it is the most substantive type of notification, so, based upon the inflection point, the system 100 notifies Alice with a content-based notification 212, so that Alice now sees that all is well with Product Alpha without having to potentially wade through all of the prior messages 202, 204, 206, 208, 210.

As can now be seen, a system constructed and operating as described herein will manage the communications received by one or more designated person(s) to intervals, by: monitoring communications between users, determining the trends and subjects of communications, comparing the trends against thresholds, segmenting the communications into intervals, and taking action on occurrence of an interval or threshold satisfaction.

Figure 3:
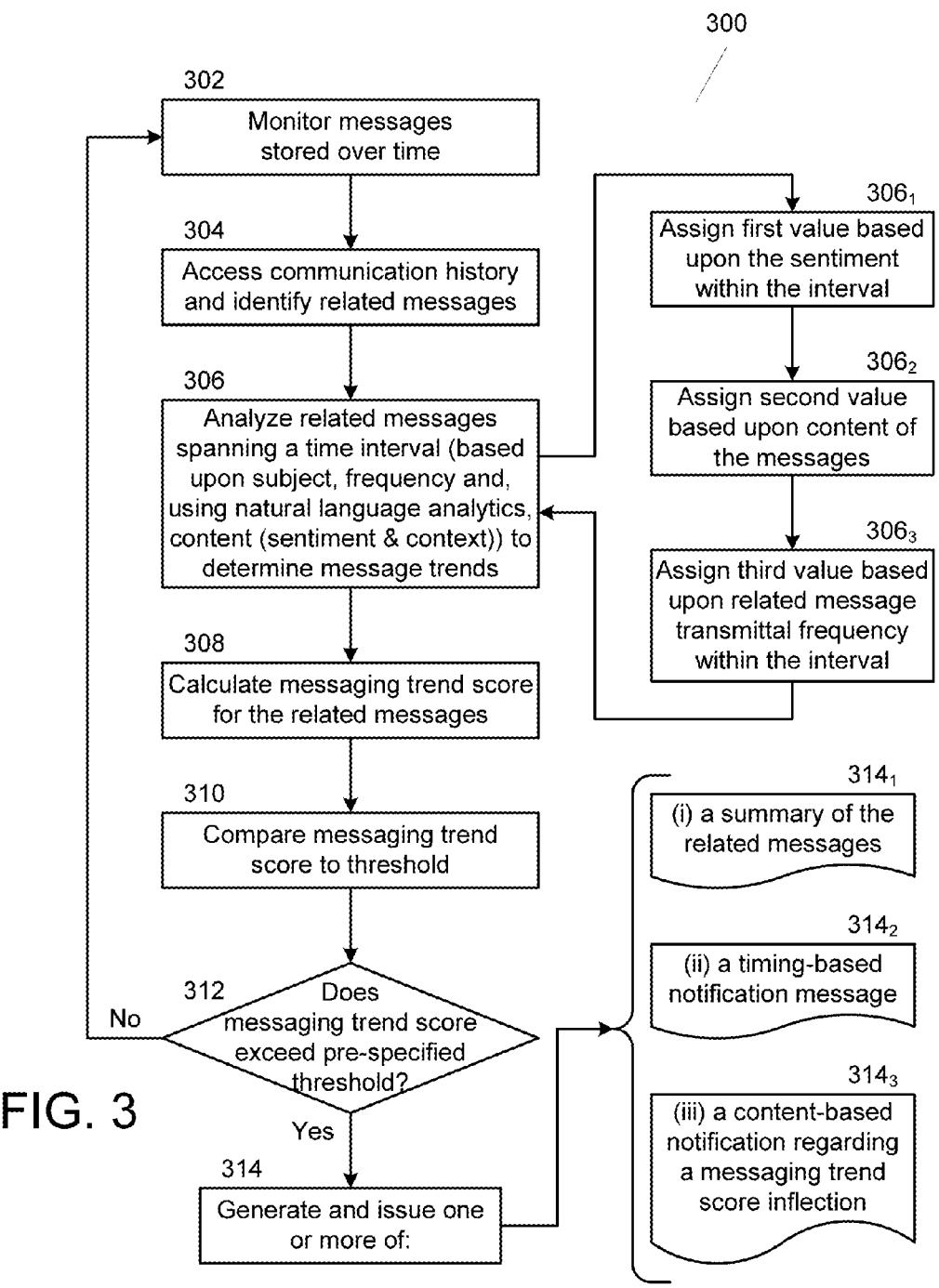
FIG. 3 illustrates, in simplified form, a flowchart for the overall process performed by a system incorporating the teachings herein.

FIG. 3 illustrates, in simplified form, a flowchart 300 for the overall process performed by a system 100 incorporating the teachings herein.

The process begins with the activation of monitoring of messages in the storage over time (Step 302).

The communication history in the storage is accessed to identify related messages (Step 304).

Next, the identified related messages are analyzed for a time interval, based upon the subject of each related message, the sentiment within each of the related messages, the context of the related messages, and the frequency or the related message transmittals in order to determine message trends (Step 306). That analysis will involve, in any order, assigning a value based upon the sentiment within the interval (Step 306$_1$), assigning a value based upon the content of the messages (Step 306$_2$), and assigning a value based upon the transmittal frequency for the messages within the interval (Step 306$_3$).

Next, a messaging trend score is calculated by combining the three values (Step 308).

The messaging trend score is then compared to some specified threshold (Step 310).

If the threshold is not met, the process returns to continues monitoring (Step 302). If the threshold is met, the system 100 will then generate and issue, to some designated person (s), one or more of: (i) a summary of the related messages (Step 314$_1$), (ii) a timing-based notification message to at least one designated person (Step 314$_2$); or (iii) a content-based notification to at least one designated person regarding an inflection in the messaging trend score (i.e., the total score or one and/or more of its components) (Step 314$_3$).

At this point it should be noted that, optionally, the analysis portion of the system 100 can be constructed so that it is activated on demand, is activated for only certain particular person(s), group(s) or times, or it can always be active. Moreover, activation can optionally alternatively be triggered by some number of messages on a topic or based upon specified rules or policies. Still further, a feedback system can be employed such that the system 100 can learn and optimize itself as far as the actions it takes based upon some threshold being met, for example, by learning to adjust frequency of notifications or recognize more fine-grained inflections or trend changes.

Having described and illustrated the principles of this application by reference to one or more example embodiments, it should be apparent that the embodiment(s) may be modified in arrangement and detail without departing from the principles disclosed herein and that it is intended that the application be construed as including all such modifications and variations insofar as they come within the spirit and scope of the subject matter disclosed.

What is claimed is:

1. A method for managing computer based messaging comprising:
   A) monitoring messages transmitted among persons within a messaging system over time, the messaging system comprising computer devices, each having at least one processor, at least some of the computer devices being individually associated with each of the persons, wherein the messages are stored in non-transitory storage, and wherein the messages collectively comprise a communication history;
   B) identifying related messages within the communication history;
   C) automatically analyzing the related messages, spanning a time interval, within the communication history, using a processor and natural language analytics, the analyzing being based upon:
      (i) subject of each of the related messages,
      (ii) sentiment within each message of the related messages,
      (iii) context of each of the related messages, and
      (iv) frequency of transmittals of the related messages, wherein the analyzing comprises assigning, using the processor, at least: a first value based upon the sentiment, a second value based upon content, and a third value based upon frequency;

D) calculating a messaging trend score for the related messages as a function of the first value, second value and third value;

E) comparing the messaging trend score to a pre-specified threshold value; and

F) when the score exceeds the pre-specified threshold value, automatically generating and issuing, using the processor, at least one of:
  (i) a summary of the related messages,
  (ii) a timing based notification message to at least one of the persons, or
  (iii) a content-based notification to at least one of the persons regarding a messaging trend score inflection point.

\* \* \* \* \*